United States Patent
Lin (10) Patent No.: US 7,559,118 B1
(45) Date of Patent: Jul. 14, 2009

(54) SAG PREVENTING HINGE AND ITS ASSEMBLY

(75) Inventor: Shu-Mu Lin, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 12/152,235

(22) Filed: May 13, 2008

(51) Int. Cl.
*E05D 3/10* (2006.01)

(52) U.S. Cl. .......................................... 16/367; 16/366

(58) Field of Classification Search .................. 16/367, 16/366, 371, 302, 303, 330, 340, 342; 248/919–923; 361/681–682
See application file for complete search history.

(56) References Cited

U.S. PATENT DOCUMENTS

| | | | | |
|---|---|---|---|---|
| 6,378,830 B1 * | 4/2002 | Lu | ........................... | 248/278.1 |
| 6,427,288 B1 * | 8/2002 | Saito | ........................... | 16/361 |
| 6,522,530 B2 * | 2/2003 | Bang | ...................... | 361/679.06 |
| 6,876,545 B2 * | 4/2005 | Tseng et al. | ........... | 361/679.06 |
| 7,017,235 B2 * | 3/2006 | Lu et al. | ........................ | 16/367 |
| 7,234,204 B2 * | 6/2007 | Liu et al. | ....................... | 16/367 |
| 7,237,755 B2 * | 7/2007 | Cho et al. | ................. | 248/274.1 |
| 7,478,458 B2 * | 1/2009 | Tajima | ......................... | 16/367 |

* cited by examiner

*Primary Examiner*—William L. Miller
(74) *Attorney, Agent, or Firm*—William E. Pelton, Esq.; Cooper & Dunham LLP (57) ABSTRACT

A hinge is mounted between a panel and a main frame of a horizontal monitor and has two turning modules, a central bracket, a tilting module and two supporting modules. The turning modules are mounted on the main frame. The central bracket is mounted pivotally between the turning modules. The tilting module is movably mounted to the central bracket. Each supporting module has holding wings abutting each other and connected respectively between the central bracket and the ends of the tilting module. Connection between the central bracket and the tilting module and abutments between the holding wings of the supporting modules form a triple connection between the panel and the main frame so prevent the hinge from sagging.

20 Claims, 11 Drawing Sheets

SAG PREVENTING HINGE AND ITS ASSEMBLY

BACKGROUND OF THE INVENTION

1. Field of the Invention

The present invention relates to a hinge and its assembly, especially to a sag preventing hinge mounted between a main frame and a panel preventing the panel from sagging.

2. Description of the Prior Arts

Figure 10:
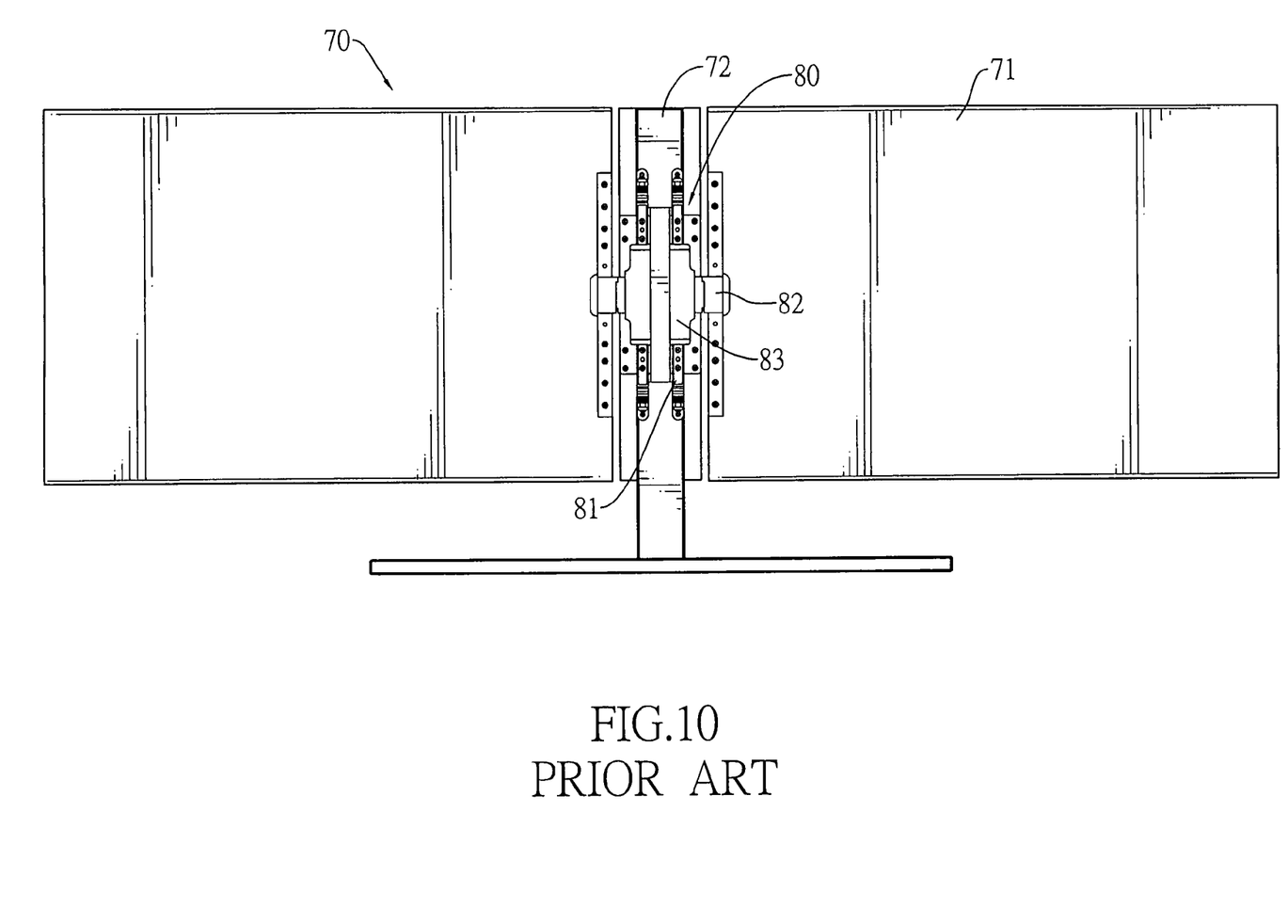
FIG. 10 is a front view of a horizontal monitor with two conventional hinges in accordance with the prior art.

With reference to FIG. 10, horizontal type monitors (70) having at least one display panel (71) are widely used in service and sales industries, especially finance, banking, travel agents and even interior design and architecture. The display panel (71) may be tilted or turned to show information displayed on the panel (71) to customers. Some industries need more than one panel to simultaneously display the information. For example, stockbrokers show the entire stock list and more detailed information of specific, selected stocks. Therefore, the horizontal type monitor (70) having a main frame (72) may have two panels (71) mounted on two sides of the main frame (72). The horizontal type monitor (70) may have two conventional hinges (80) mounted between the panels (71) and the main frame (72).

The conventional hinge (80) has two turning modules (81), a central bracket (83) and a tilting module (82). The turning modules (81) are connected to the main frame (72). The central bracket (83) is connected pivotally between the turning modules (81). The tilting module (82) is connected pivotally to the central bracket (83) and is mounted securely on the corresponding panel (71).

Figure 11:
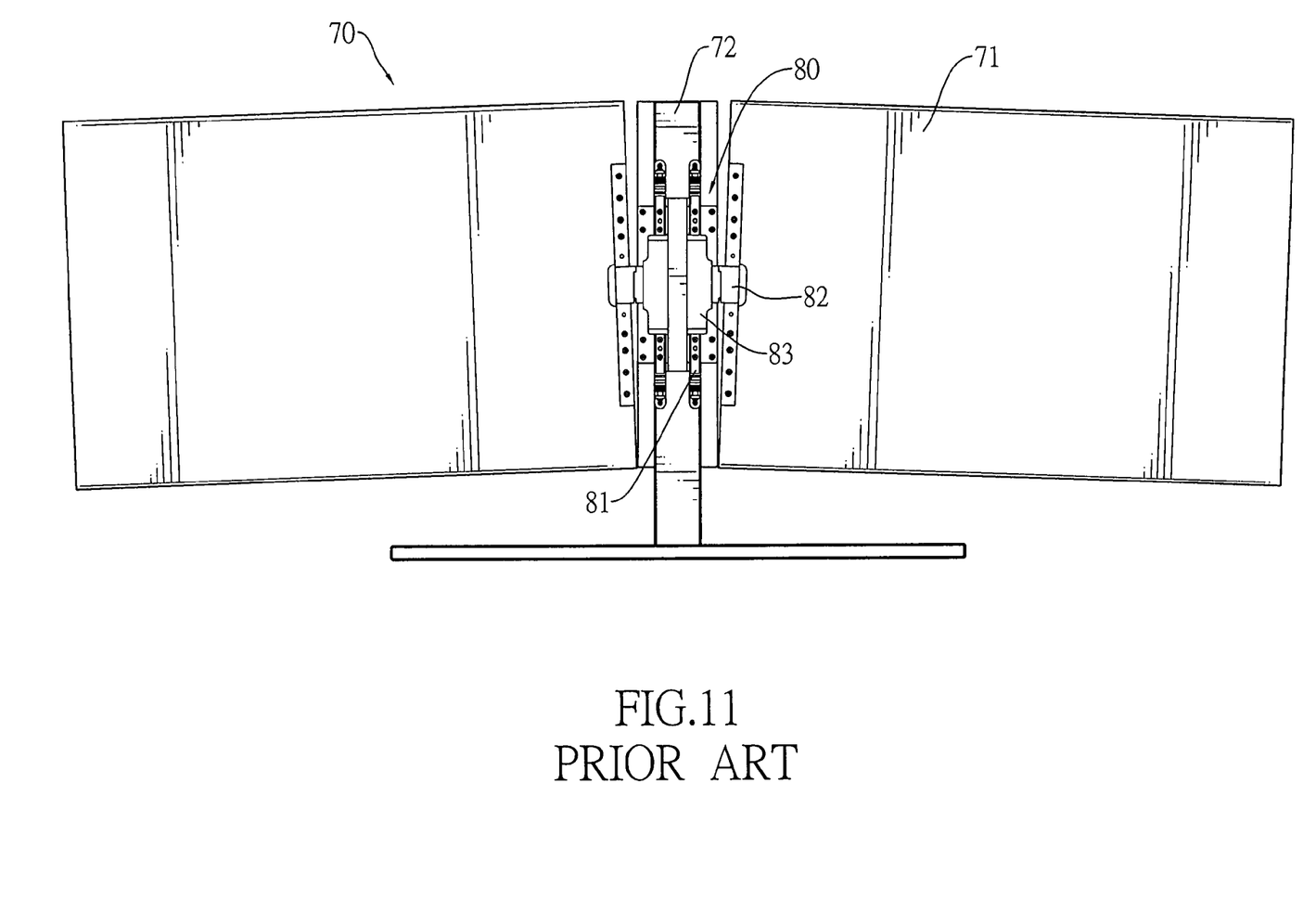
FIG. 11 is an operational front view of the horizontal monitor in FIG. 10.

However, with further reference to FIG. 11, the panels (71) have a weight. The panel (71) and main frame (72) are only connected by the central bracket (83) and the tilting module (82) at a connecting part. Therefore, the weight of the panel (71) forces the connecting part down so the panels (71) are not disposed parallelly after using for a period of time, instead, the panels tend to sag forming an inverted V. Furthermore, the weight of the panel (71) constantly forces the connecting part between the central bracket (83) and the tilting module (82) and may damage the connecting part over long term use.

To overcome the shortcomings, the present invention provides a hinge and its assembly preventing the panel from sagging to mitigate or obviate the aforementioned problems.

SUMMARY OF THE INVENTION

The main objective of the present invention is to provide a hinge and a hinge assembly preventing a panel of a horizontal monitor from sagging. The hinge is mounted between a panel and a main frame of a horizontal monitor and has two turning modules, a central bracket, a tilting module and two supporting modules. The turning modules are mounted on the main frame. The central bracket is mounted pivotally between the turning modules. The tilting module is connected to the central bracket. Each supporting module has holding wings abutting to each other and connected respectively between the central bracket and the ends of the tilting module. Connection between the central bracket and the tilting module and abutment between the holding wings of the supporting modules form a triple connection between the panel and the main frame. The abutment between the holding wings of the supporting modules prevents the panel from sagging relative to the main frame.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
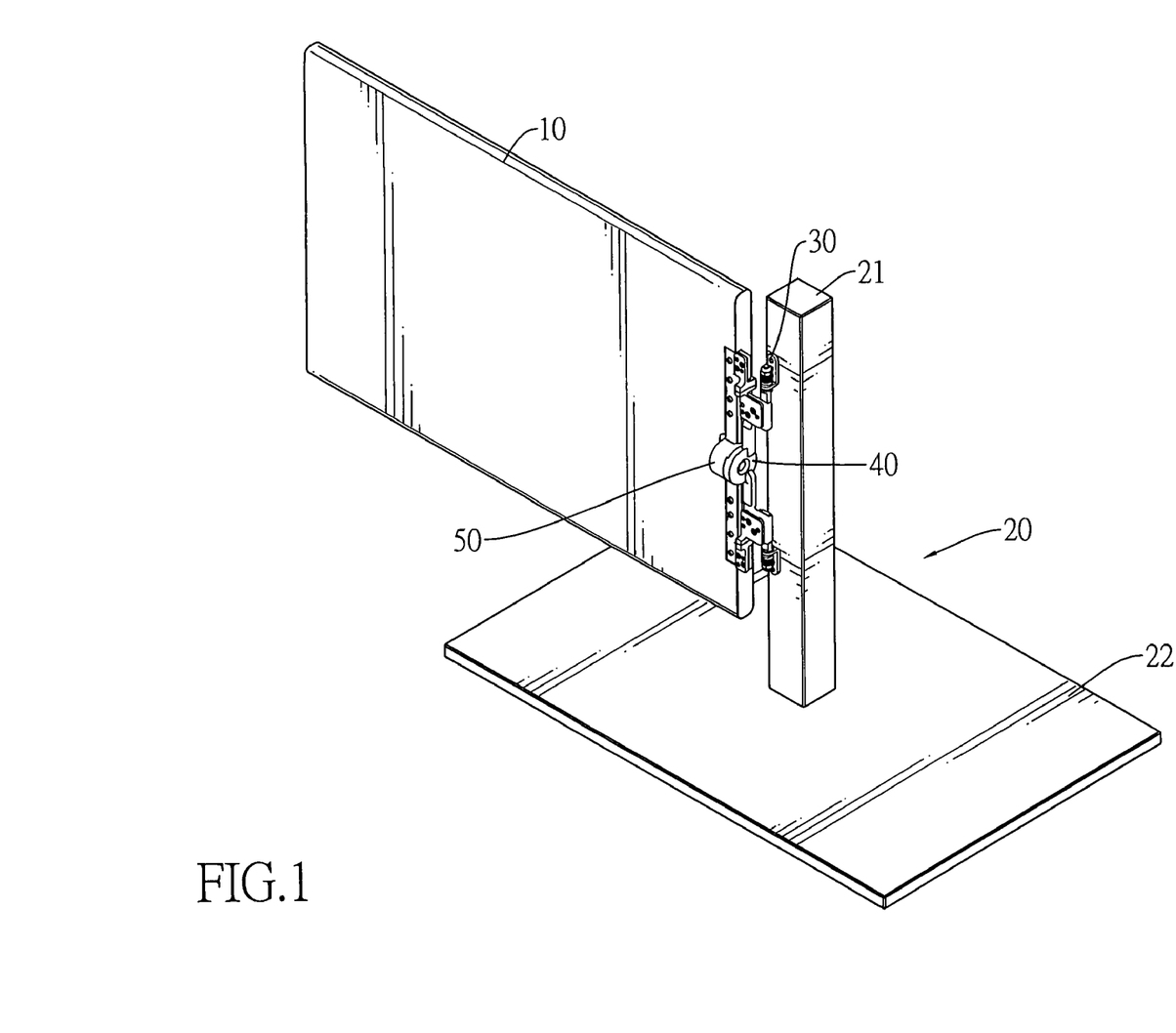
FIG. 1 is a perspective view of a hinge in accordance with the present invention being mounted in a horizontal monitor.
Figure 2:
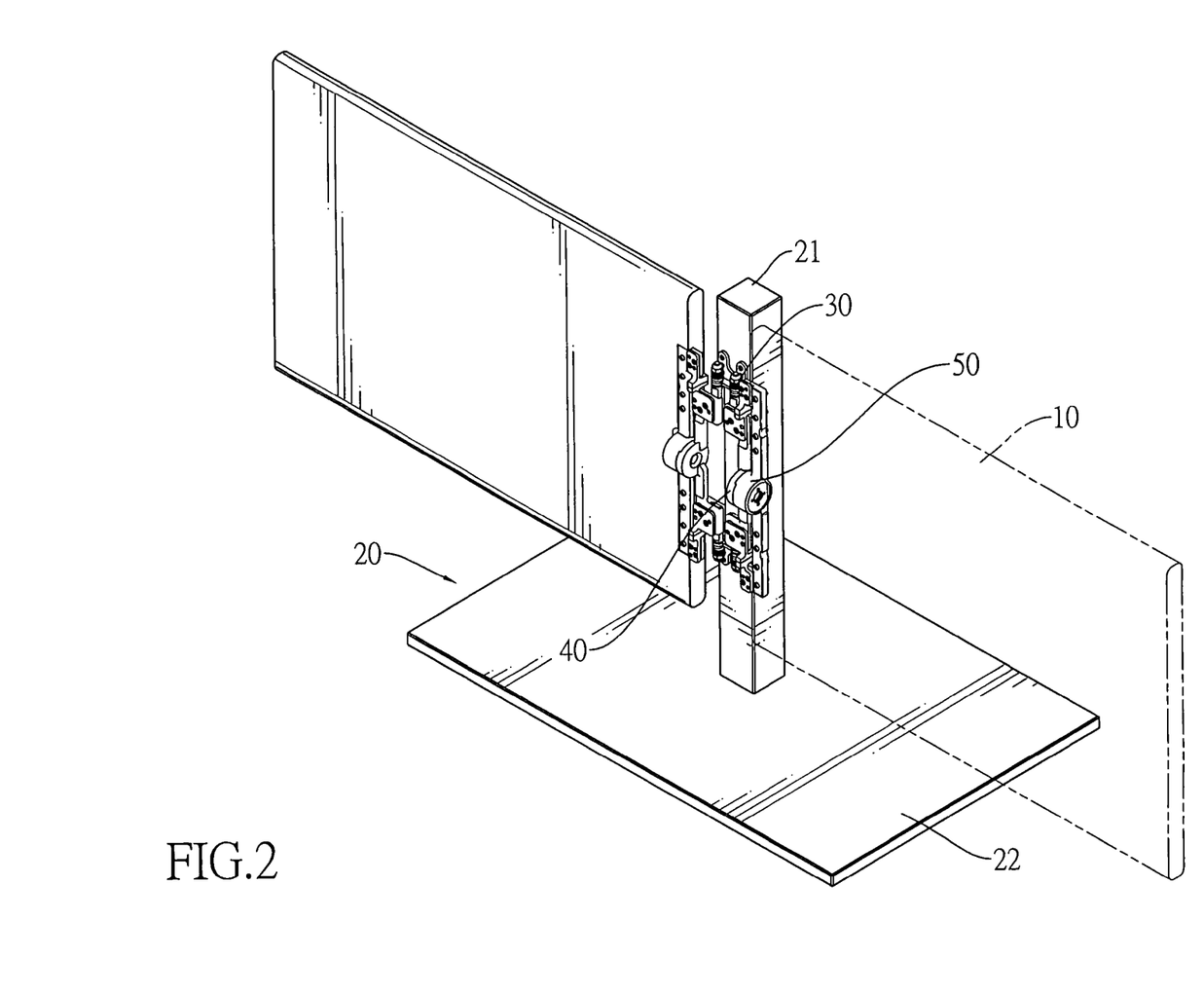
FIG. 2 is perspective view of a hinge assembly in accordance with the present invention.
Figure 3:
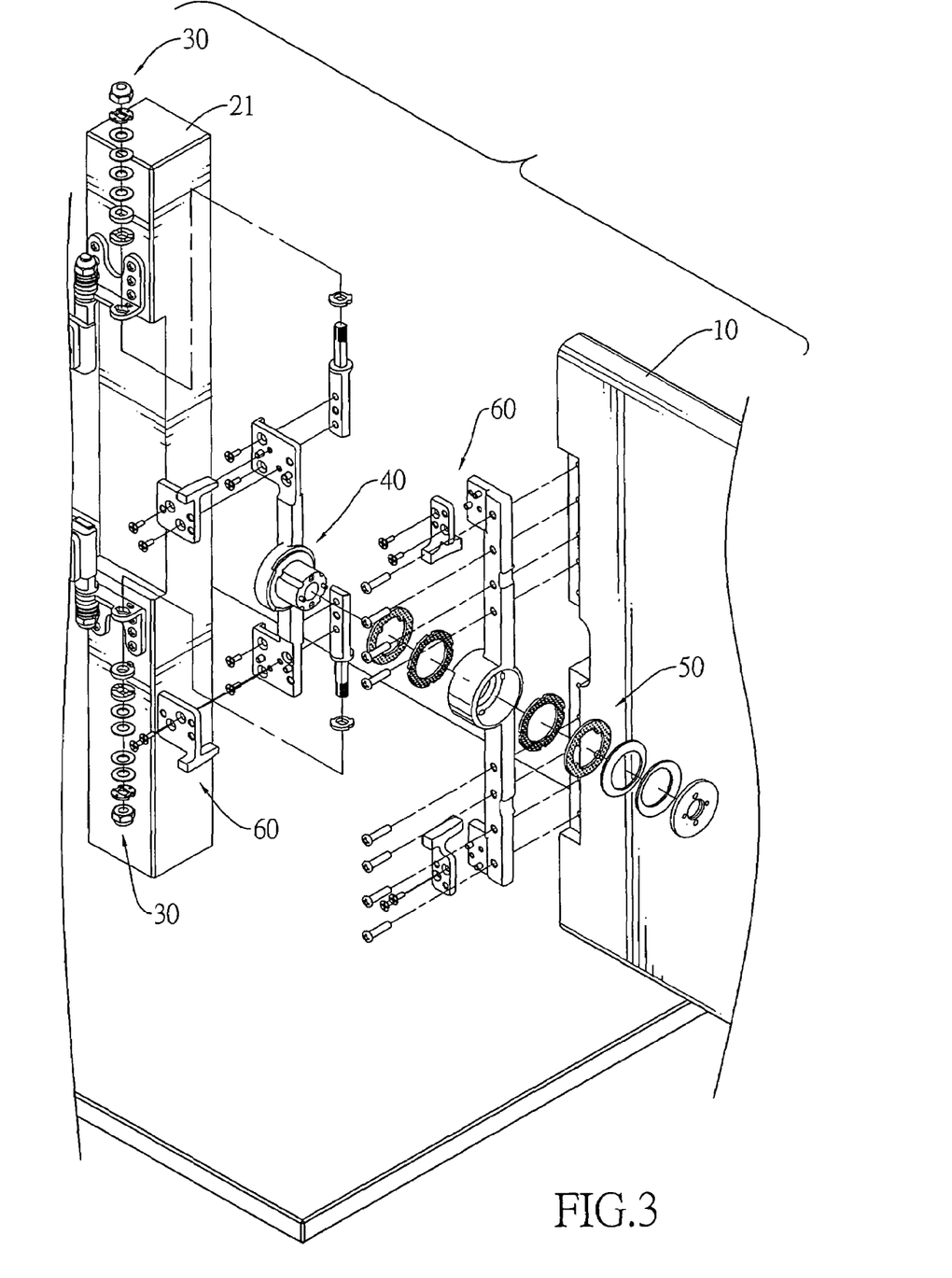
FIG. 3 is an exploded perspective view of the hinge assembly in FIG. 2.

With reference to FIGS. 1, 2 and 3, a horizontal monitor has at least one panel (10), a main frame (20) and a hinge in accordance with the present invention. The main frame (20) has a base (22) and a stanchion (21), the stanchion (21) being attached to and protruding from the base (22) and having at least one side. The hinge movably mounts a corresponding panel (10) on the stanchion (21). Two panels (10) may be implemented with a hinge assembly in accordance with the present invention. The hinge assembly has two hinges respectively, moveably mounting the two panels onto the stanchion (21) of the main frame (20) and the hinges being connected to each other.

The hinge comprises two turning modules (30), a central bracket (40), a tilting module (50) and two supporting modules (60).

Figure 4:
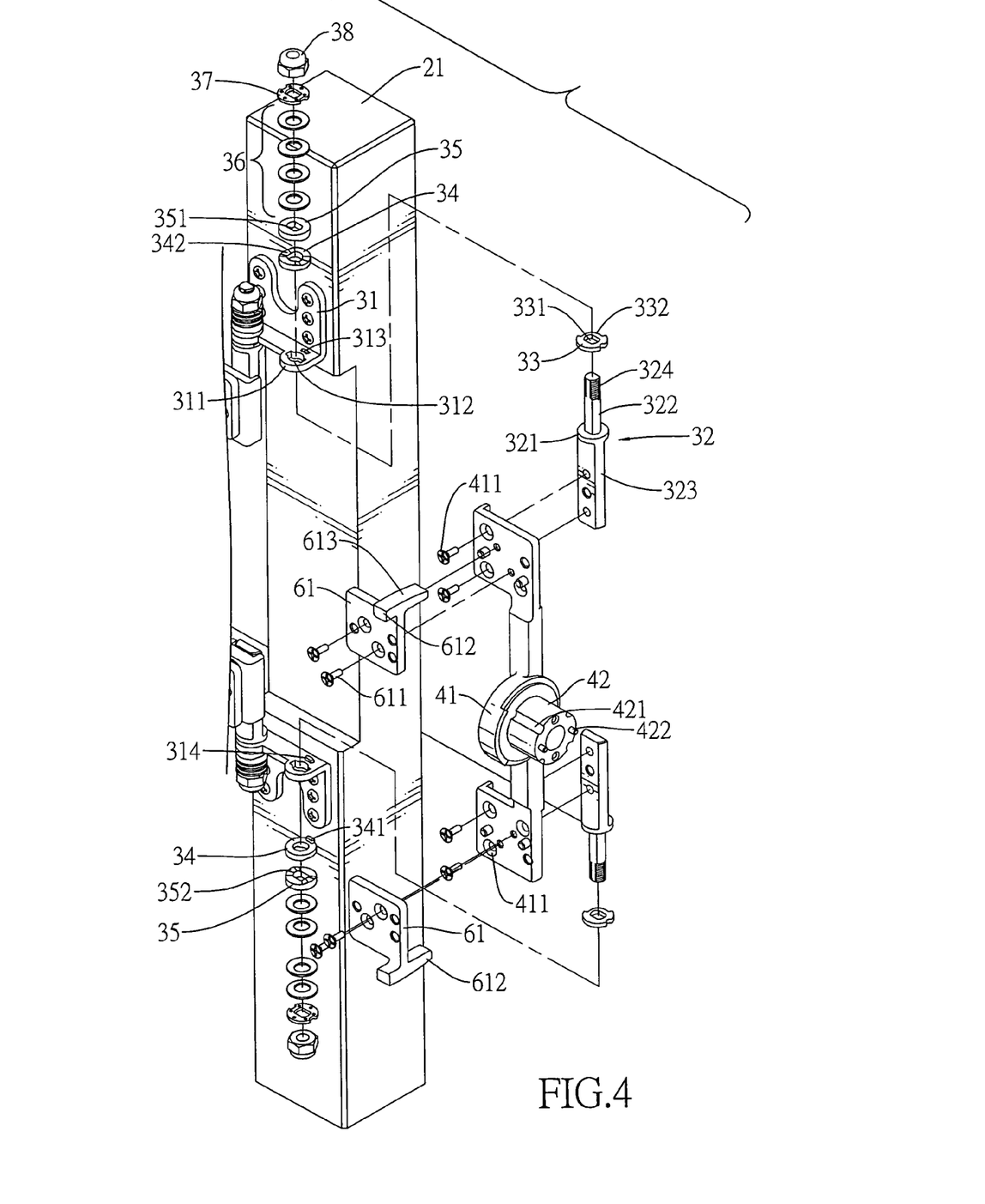
FIG. 4 is a partially exploded perspective view of the hinge assembly in FIG. 2.

With further reference to FIG. 4, the turning modules (30) are disposed facing each other and are mounted on the side of the stanchion (21). Each turning module (30) has a stationary bracket (31), a pintle (32), a limiting spacer (33), a stationary positioning spacer (34), a rotating positioning spacer (35), a biasing member (36), an abrasion spacer (37) and a retaining spacer (38).

Figure 7:
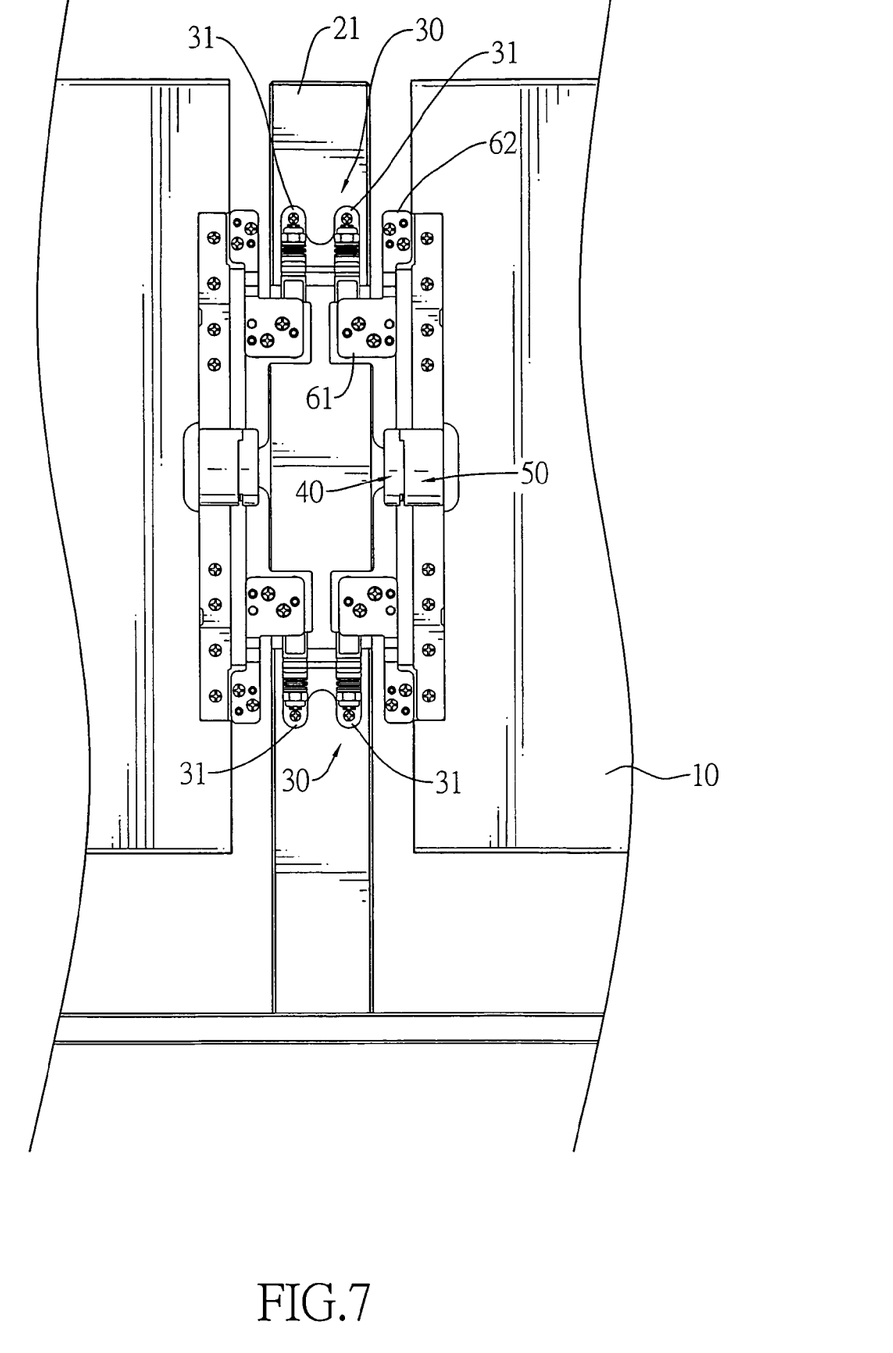
FIG. 7 is a front view of the hinge assembly in FIG. 2.

The stationary bracket (31) is mounted securely on the stanchion (21) and has an end and a connecting wing (311). The connecting wing (311) is formed on and protrudes from the end of the stationary bracket (31) and has an outer side, an inner side, a central hole (312), a fastening recess (313) and a limiting protrusion (314). The fastening recess (313) is formed in the outer side of the connecting wing (311). The limiting protrusion (314) is formed on the inner side of the connecting wing (311). With further reference to FIG. 7, when two hinges are implemented on the main frame (20) as a hinge assembly in accordance with the present invention, the hinges may be mounted adjacent to one another and the stationary brackets (31) are integrally formed with each other.

The pintle (32) is mounted pivotally in the stationary bracket (31) and has a head (321), a pivoting rod (322) and a securing rod (323). The head (321) has an outer side and an inner side. The pivoting rod (322) is non-circular in cross section, is formed axially on the outer side of the head (321), protrudes through the central hole (312) of the stationary bracket (31) and has a distal end and a thread (324). The thread (324) is formed around the distal end of the pivoting rod (322). The securing rod (323) is formed on the inner side of the head (321).

The limiting spacer (33) is mounted securely around the pivoting rod (322) of the pintle (32), abuts the inner side of the connecting wing (311) and has a non-circular hole (331), an annular edge and an arc recess (332). The non-circular hole (331) engages the pivoting rod (322) to mount the limiting spacer (33) securely on the pivoting rod (322). The arc recess (332) is formed transversely in the annular edge of the limiting spacer (33), corresponds to and selectively abuts the limiting protrusion (314) of the connecting wing (311) to limit the rotating angle of the pintle (32).

The stationary positioning spacer (34) is mounted around the pivoting rod (322) of the pintle (32), abuts the outer side of the connecting wing (311) and has an outer side, an inner side, a fastening protrusion (341) and at least one positioning detent (342). The fastening protrusion (341) is formed on the inner side of the stationary positioning spacer (34) and is mounted securely in the fastening recess (313) of the connecting wing (311). The at least one positioning detent (342) is formed in the outer side of the stationary positioning spacer (34).

The rotating positioning spacer (35) is mounted securely around the pivoting rod (322) of the pintle (32), abuts the outer side of the stationary positioning spacer (34) and has a non-circular hole (351), an inner side and at least one positioning protrusion (352). The non-circular hole (351) corresponds to and engages the pivoting rod (322) to mount the rotating positioning spacer (35) securely on the pivoting rod (322). The at least one positioning protrusion (352) is formed on the inner side of the rotating positioning spacer (35) and corresponds to and selectively engages the at least one positioning detent (342) of the stationary positioning spacer (34) to provide a positioning function.

The biasing member (36) is mounted around the pivoting rod (322) adjacent to the rotating positioning spacer (35).

The abrasion spacer (37) is mounted around the pivoting rod (322) to reduce abrasion.

The retaining spacer (38) is mounted securely on the pintle (32), may be mounted securely on the distal end of the pivoting rod (322) and may be a nut engaging the thread (324) of the pivoting rod (322), a cap, rivet or the like.

The central bracket (40) is connected between two corresponding turning modules (30) and has a couple (41) and a central shaft (42). The couple (41) is mounted securely between the pintles (32) of the turning modules (30) and has a center, two ends and multiple fasteners (411). The fasteners (411) are respectively mounted securely through the ends of the couple (41) and the securing rods (323) of the pintles (32) to mount the couple (41) securely between the pintles (32). The central shaft (42) is formed on and protrudes from the center of the couple (41) and has an annular wall, a distal surface, multiple slots (421) and multiple fastening bosses (422). The slots (421) are formed longitudinally in the annular wall and through the distal surface of the central shaft (42). The fastening bosses (422) are formed longitudinally on and protrude from the distal surface of the central shaft (42).

Figure 5:
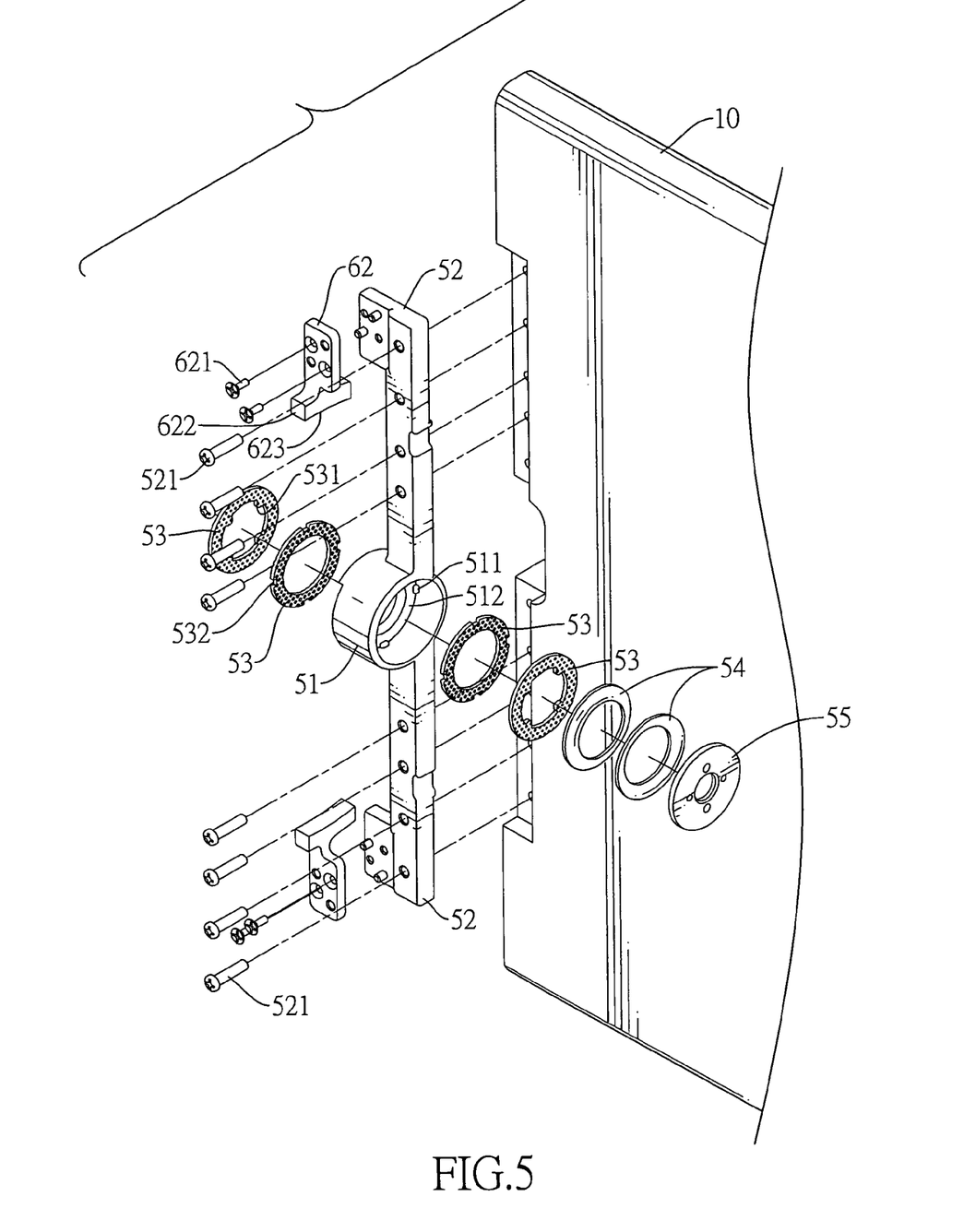
FIG. 5 is an enlarged, partially exploded perspective view of the hinge assembly in FIG. 2.

With further reference to FIG. 5, the tilting module (50) is connected to the central bracket (40) and comprises a central sleeve (51), two connecting bars (52), multiple abrasion washers (53), multiple resilient washers (54) and a fastening washer (55).

The central sleeve (51) is mounted around the central shaft (42) of the central bracket (40) and has an outside wall, an inside wall, an annular shoulder (512) and multiple projections (511). The annular shoulder (512) is formed around the inside wall of the central sleeve (51) and has two sides. The projections (511) are formed transversely on the inside wall of the central sleeve (51) adjacent to the two sides of the annular shoulder (512).

The connecting bars (52) are formed on and protrude diametrically from the outside wall of the central sleeve (51) and are connected securely to the corresponding panel (10) by multiple fasteners (521). Each connecting bar (52) has a distal end.

The abrasion washers (53) are mounted around the central shaft (42) of the central bracket (40), are mounted in the central sleeve (51) and include multiple first abrasion washers and multiple second abrasion washers. Each first abrasion washer is mounted securely around the central shaft (42) and has an inner edge and multiple projections (531). The projections (531) are formed transversely on the inner edge of the first abrasion washer and engage the slots (421) of the central shaft (42) to mount the first abrasion washer securely around the central shaft (42). Each second abrasion washer has an outer edge and multiple fastening detents (532). The fastening detents (532) are formed transversely in the annular wall of the second abrasion washer and engage the projections (511) of the central sleeve (51) to mount the second abrasion washer securely in the central sleeve (51).

The resilient washers (54) are mounted adjacent to the central shaft (42) of the central bracket (40) and are mounted in the central sleeve (51).

The fastening washer (55) is mounted securely on the distal surface of the central shaft (42) of the central bracket (40) may be by riveting the fastening bosses (422) in the fastening washer (55), by using nuts and threads in the fastening bosses (422) or holes and fasteners.

Figure 6:
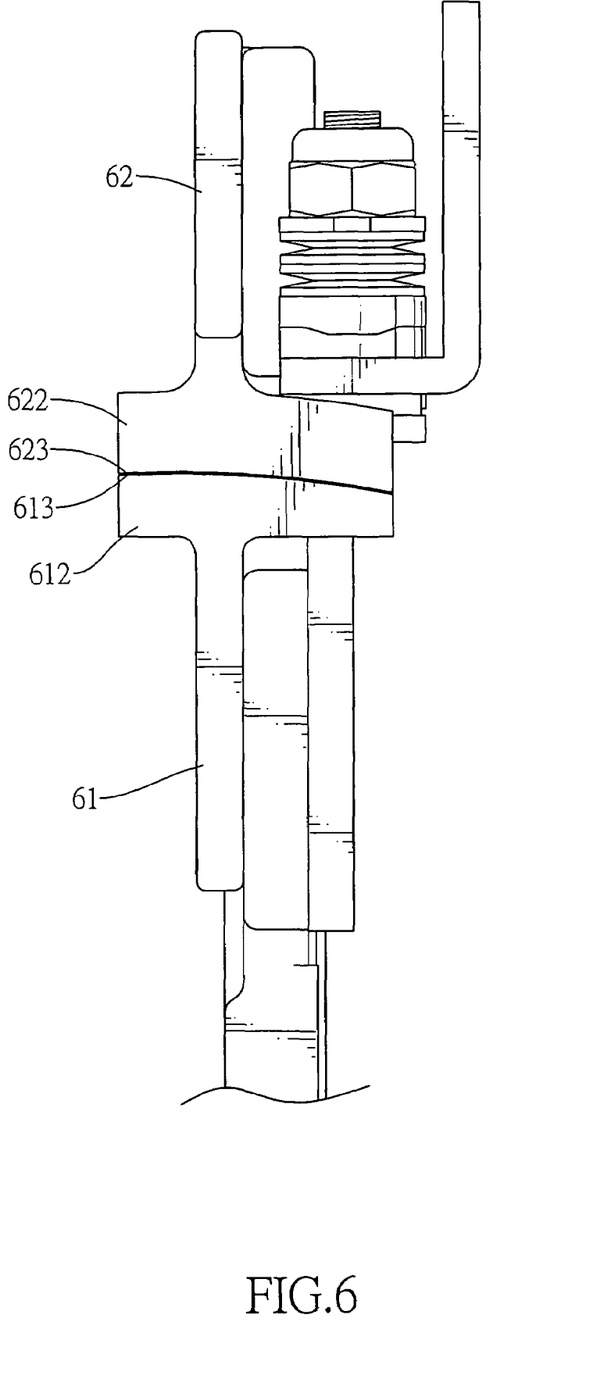
FIG. 6 is an enlarged side view in partial section of the hinge assembly in FIG. 2.

With further reference to FIG. 6, the supporting modules (60) are mounted on the ends of the couple (41) of the central bracket (40) and the distal ends of the connecting bars (52) of the tilting module (50). Each supporting module (60) comprises a stationary leaf (61) and a turning leaf (62). The stationary leaf (61) is mounted securely on a corresponding end of the couple (41) by multiple fasteners (611) and has a proximal end and a holding wing (612). The holding wing (612) is formed perpendicularly on the proximal end of the stationary leaf (61) and has an arced outer surface (613). The turning leaf (62) is mounted securely on the distal end of a corresponding connecting bar (52) by multiple fasteners (621) and has a proximal end and a holding wing (622). The holding wing (622) of the turning leaf (62) is formed perpendicularly on the proximal end of the turning leaf (62) and has an arced inner surface (623). The arced inner surface (623) of the turning leaf (62) corresponds to and selectively abuts the arced outer surface (613) of the stationary leaf (61).

Figure 8:
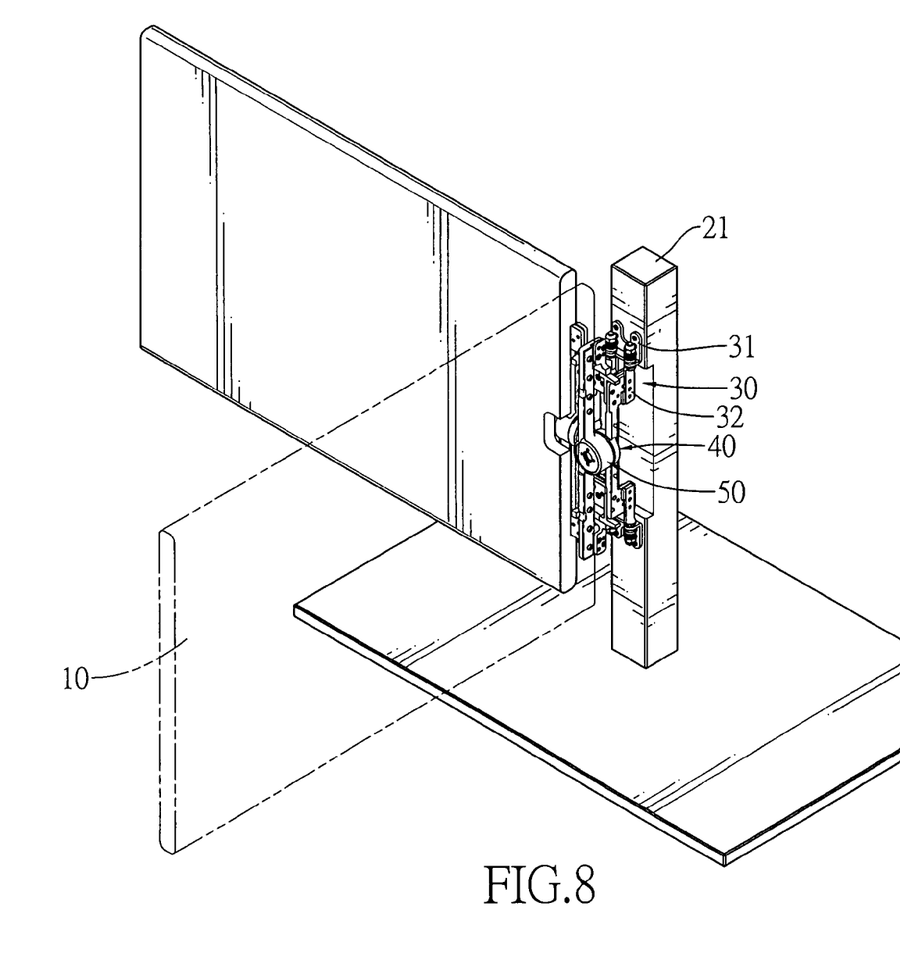
FIG. 8 is an operational perspective view of the horizontal monitor in FIG. 2.

With further reference to FIG. 8, when the panel (10) is pivoted on the pintles (32) of the turning modules (30), the central bracket (40) and the pintles (32) are rotated relative to the stationary brackets (31). Thus, the panel (10) is rotated about the stanchion (21) by 90 degrees.

Figure 9:
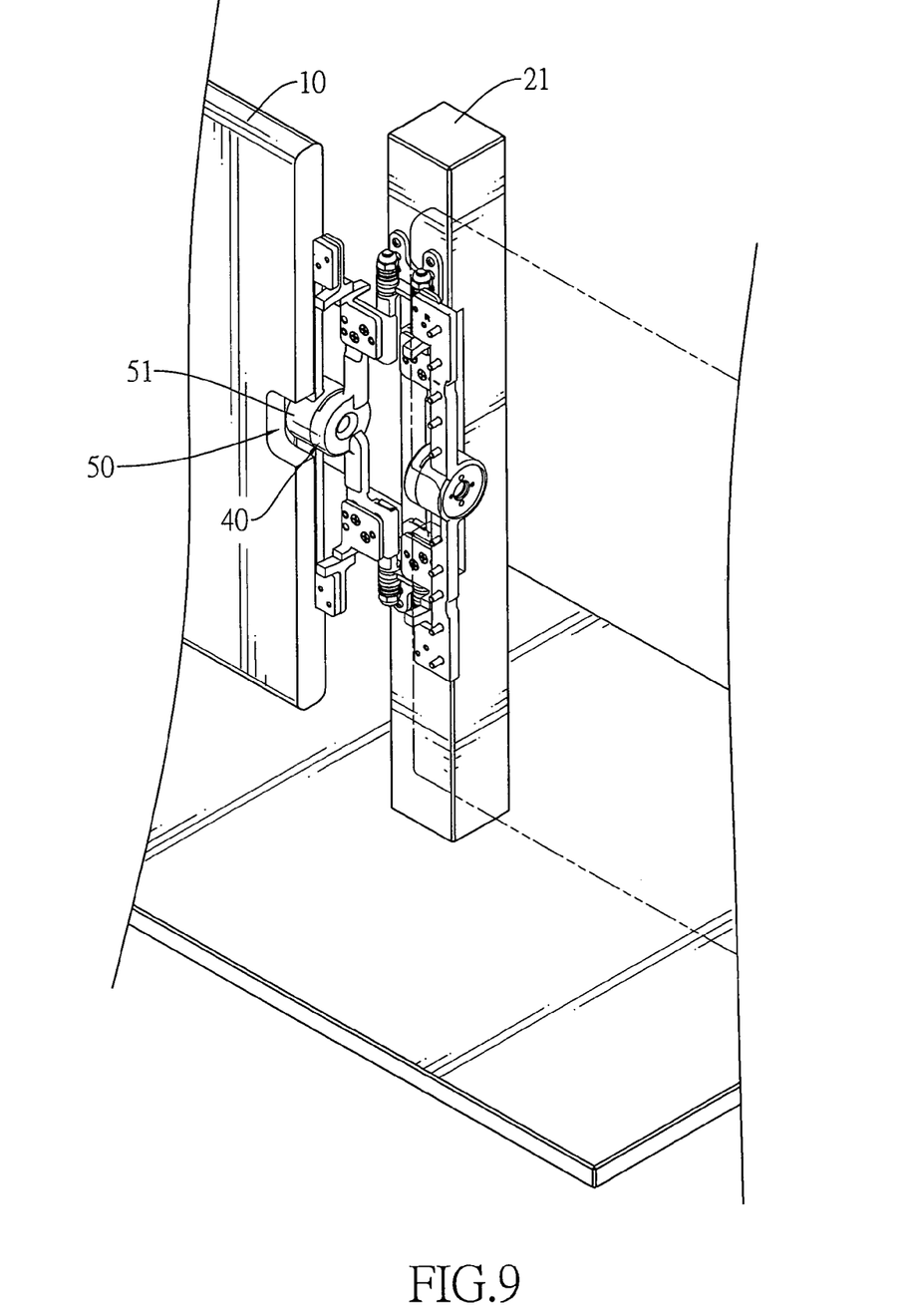
FIG. 9 is an enlarged operational perspective view of the horizontal monitor in FIG. 2.

With reference to FIG. 9, when the panel (10) is rotated about the central sleeve (51) of the tilting module (50), the central sleeve (51) is rotated relative to the central bracket (40) to adjust a tilt of the panel (10) on an axis perpendicular to the stanchion (21).

The hinge has the following advantages. The connection between the central bracket (40) and the tilting module (50) and the abutment between the holding wings (612, 622) of the supporting modules (60) form a triple connection between the panel (10) and the stanchion (21). Therefore, the connection between the panel (10) and the main frame (20) is more stable. Furthermore, the abutment between the holding wings (612, 622) of the supporting modules (60) prevent the panel (10) from sagging relative to the stanchion (21). Therefore, the panel (10) is maintained horizontal and the hinge and the hinge assembly as described are not damaged by a weight of the panel (10) so the horizontal monitor has an extended life time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   two turning modules being disposed facing each other, and each turning module having
      a stationary bracket;
      a pintle mounted pivotally in the stationary bracket; and
      a retaining spacer being mounted securely on the pintle;
   a central bracket being connected between the turning modules and having
      a couple being mounted securely between the pintles of the turning modules and having a center and two ends; and
      a central shaft being formed on and protruding from the center of the couple and having a distal surface;
   a tilting module being connected to the central bracket and having
      a central sleeve being mounted around the central shaft of the central bracket and having an outside wall;
      two connecting bars being formed transversely on and protruding diametrically from the outside wall of the central sleeve and each connecting bar having a distal end; and
      a fastening washer being mounted securely on the distal surface of the central shaft; and
   two supporting modules being mounted on the ends of the couple of the central bracket and the distal ends of the connecting bars of the tilting module, and each supporting module comprising
      a stationary leaf being mounted securely on a corresponding end of the couple and having
         a proximal end; and
         a holding wing being formed perpendicularly on the proximal end of the stationary leaf and having an arced outer surface; and
      a turning leaf being mounted securely on the distal end of a corresponding connecting bar and having
         a proximal end; and
         a holding wing being formed perpendicularly on the proximal end of the turning leaf and having an arced inner surface corresponding to and selectively abutting the arced outer surface of the stationary leaf.

2. The hinge as claimed in claim 1, wherein
   the stationary bracket of each turning module further has
      an end; and
      a connecting wing being formed on and protruding from the end of the stationary bracket and having a central hole; and
   the pintle of each turning module further has
      a head having an outer side and an inner side;
      a pivoting rod being formed axially on the outer side of the head and protruding through the central hole of the stationary bracket of the turning module; and
      a securing rod being formed on the inner side of the head.

3. The hinge as claimed in claim 2, wherein
   the connecting wing of the stationary bracket of each turning module further has
      an outer side;
      an inner side; and
      a limiting protrusion being formed on the inner side of the connecting wing; and
   each turning module has a limiting spacer being mounted securely around the pivoting rod of the pintle, abutting the inner side of the connecting wing and having
      an annular edge; and
      an arc recess being formed transversely in the annular edge of the limiting spacer and corresponding to and selectively abutting the limiting protrusion of the connecting wing of the stationary bracket.

4. The hinge as claimed in claim 3, wherein each turning further module has
   a stationary positioning spacer being mounted around the pivoting rod of the pintle, abutting the outer side of the connecting wing of the stationary bracket and having
      an outer side;
      an inner side; and
      at least one positioning detent being formed in the outer side of the stationary positioning spacer;
   a rotating positioning spacer being mounted securely around the pivoting rod of the pintle, abutting the outer side of the stationary positioning spacer and having
      an inner side; and
      at least one positioning protrusion being formed on the inner side of the rotating positioning spacer and corresponding to and selectively engaging the at least one positioning detent of the stationary positioning spacer; and
   a biasing member being mounted around the pivoting rod adjacent to the rotating positioning spacer.

5. The hinge as claimed in claim 4, wherein
   the connecting wing of the stationary bracket of each turning module has a fastening recess being formed in the outer side of the connecting wing; and
   the stationary positioning spacer of each turning module has a fastening protrusion being formed on the inner side of the stationary positioning spacer and being mounted securely in the fastening recess of the connecting wing of the stationary bracket.

6. The hinge as claimed in claim 5, wherein
   the pivoting rod of the pintle of each turning module is non-circular in cross section;
   the limiting spacer of each turning module has a non-circular hole engaging the pivoting rod of the pintle; and
   the rotating positioning spacer of each turning module has a non-circular hole engaging the pivoting rod of the pintle.

7. The hinge as claimed in claim 6, wherein each turning module has an abrasion spacer being mounted around the pivoting rod of the pintle.

8. The hinge as claimed in claim 7, wherein
   the pivoting rod of the pintle of each turning module has
      a distal end; and a thread being formed around the distal end of the pivoting rod; and the retaining spacer of each turning module is a nut engaging the thread of the pivoting rod of the pintle.

9. The hinge as claimed in claim 8, wherein the central shaft of the central bracket has an annular wall; and multiple slots being formed longitudinally in the annular wall and through the distal surface of the central shaft;

the central sleeve of tilting module has an inside wall; and multiple projections being formed transversely on the inside wall of the central sleeve; and the tilting module has multiple abrasion washers being mounted around the central shaft of the central bracket, being mounted in the central sleeve and including multiple first abrasion washers being mounted securely around the central shaft, and each first abrasion washer having an inner edge; and multiple projections being formed transversely on the inner edge of the first abrasion washer and engaging the slots of the central shaft; and multiple second abrasion washers being mounted securely in the central sleeve, and each second abrasion washer having an outer edge; and multiple fastening detents being formed transversely in the outer edge of the second abrasion washer and engaging the projections of the central sleeve.

10. The hinge as claimed in claim 9, wherein the central shaft of the central bracket has multiple fastening bosses being formed longitudinally on and extending out from the distal surface of the central shaft and being mounted securely in the fastening washer of the tilting module.

11. The hinge as claimed in claim 10, wherein the central sleeve of the tilting module has an annular shoulder being formed around the inside wall of the central sleeve; and the tilting module has multiple resilient washers being mounted adjacent to the central shaft of the central bracket and being mounted in the central sleeve.

12. The hinge as claimed in claim 11, wherein the stationary leaf of each supporting module is mounted securely on a corresponding end of the couple by multiple fasteners; and the turning leaf of each supporting module is mounted securely on the distal end of a corresponding connecting bar by multiple fasteners.

13. The hinge as claimed in claim 12, wherein the couple has multiple fasteners being respectively mounted securely through the ends of the couple and the securing rods of the pintles of the turning modules.

14. The hinge as claimed in claim 2, wherein the couple has multiple fasteners being respectively mounted securely through the ends of the couple and the securing rods of the pintles of the turning modules.

15. The hinge as claimed in claim 1, wherein the tilting module has multiple abrasion washers being mounted around the central shaft of the central bracket and being mounted in the central sleeve.

16. The hinge as claimed in claim 15, wherein the central shaft of the central bracket has an annular wall; and multiple slots being formed longitudinally in the annular wall, through the distal surface of the central shaft;

the central sleeve of tilting module has an inside wall; and multiple projections being formed transversely on the inside wall of the central sleeve; and the abrasion washers include multiple first abrasion washers being mounted securely around the central shaft, and each first abrasion washer having an inner edge; and multiple projections being formed transversely on the inner edge of the first abrasion washer and engaging the slots of the central shaft; and multiple second abrasion washers being mounted securely in the central sleeve, and each second abrasion washer having an outer edge; and multiple fastening detents being formed transversely in the annular wall of the second abrasion washer and engaging the projections of the central sleeve.

17. The hinge as claimed in claim 1, wherein the central shaft of the central bracket has multiple fastening bosses being formed longitudinally on and protruding from the distal surface of the central shaft and being mounted securely in the fastening washer of the tilting module.

18. The hinge as claimed in claim 1, wherein the central sleeve of the tilting module has an inside wall; and an annular shoulder being formed around the inside wall of the central sleeve and has two sides; and the tilting module has multiple resilient washers being mounted adjacent to the central shaft of the central bracket and being mounted in the central sleeve.

19. The hinge as claimed in claim 1, wherein the stationary leaf of each supporting module is mounted securely on a corresponding end of the couple by multiple fasteners; and the turning leaf of each supporting module is mounted securely on the distal end of a corresponding connecting bar by multiple fasteners.

20. A hinge assembly comprising two of the hinges as claimed in claim 1, wherein the turning modules of one hinge respectively corresponding to the turning module of another hinge; and the stationary bracket of each turning module of the one hinge is integrated with the stationary bracket of the corresponding turning module of the another hinge.

* * * * *